US006952637B2

(12) United States Patent
Barron et al.

(10) Patent No.: US 6,952,637 B2
(45) Date of Patent: Oct. 4, 2005

(54) ROUGH ROAD DETECTION USING SUSPENSION SYSTEM INFORMATION

(75) Inventors: Richard J. Barron, Ann Arbor, MI (US); Danny R. Milot, Ann Arbor, MI (US); Kenneth A. Doll, Ann Arbor, MI (US); Steven Dale Keen, Lahnstein (DE)

(73) Assignee: Kelsey-Hayes Company, Livonia, MI (US)

( * ) Notice: Subject to any disclaimer, the term of this patent is extended or adjusted under 35 U.S.C. 154(b) by 14 days.

(21) Appl. No.: 10/363,800

(22) PCT Filed: Sep. 7, 2001

(86) PCT No.: PCT/US01/28201

§ 371 (c)(1), (2), (4) Date: Mar. 6, 2003

(87) PCT Pub. No.: WO02/20319

PCT Pub. Date: Mar. 14, 2002

(65) Prior Publication Data

US 2004/0015279 A1 Jan. 22, 2004

Related U.S. Application Data

(63) Continuation of application No. 09/659,028, filed on Sep. 9, 2000, now abandoned.

(51) Int. Cl.[7] ................................ B60R 22/00

(52) U.S. Cl. ................................ 701/48; 701/36; 701/38

(58) Field of Search ................................ 701/1, 36, 38, 701/83, 84, 82, 90, 91, 48; 180/197; 303/196, 145, 139

(56) References Cited

U.S. PATENT DOCUMENTS

| | | | | |
|---|---|---|---|---|
| 5,009,279 A | * | 4/1991 | Matsuda | 180/197 |
| 5,009,294 A | * | 4/1991 | Ghoneim | 477/185 |
| 5,117,934 A | * | 6/1992 | Tsuyama et al. | 180/197 |
| 5,222,570 A | * | 6/1993 | Kawamura et al. | 180/197 |
| 6,460,647 B1 | * | 10/2002 | Schmitt | 180/197 |
| 6,591,178 B2 | * | 7/2003 | Krueger et al. | 701/83 |

FOREIGN PATENT DOCUMENTS

| | | |
|---|---|---|
| DE | 41 33 238 A | 4/1993 |
| DE | 199 46 463 C | 4/2001 |
| EP | 0 449 118 A | 10/1991 |
| EP | 0 655 362 A | 5/1995 |
| WO | 00/06433 | 2/2000 |

* cited by examiner

*Primary Examiner*—Richard M. Camby
(74) *Attorney, Agent, or Firm*—MacMillan, Sobanski & Todd, LLC

(57) ABSTRACT

Direct sensing of rough road conditions are used to modify operation of a wheel slip control system. At least one suspension sensor (139) senses an operating parameter of the suspension system. A road surface classifier is responsive to the suspension pension sensor (139) for generating a road surface signal representing a roughness of a road surface over which the vehicle travels. A braking system includes a wheel speed sensor and a brake actuator. An active braking control detector wheel slip in response to the wheel speed sensor (108) during at least one of braking or accelerating of the vehicle and modulates the brake actuator in response to the detected wheel slip. The active braking control is responsive to the road surface signal for modifying modulation f the brake actuator as a function of the road surface signal.

12 Claims, 5 Drawing Sheets

ROUGH ROAD DETECTION USING SUSPENSION SYSTEM INFORMATION

This application filed under 35 U.S.C. 371, is the National Stage of International Application No. PCT/US01/28201, filed on Sep. 7, 2001, is a continuation of U.S. Utility patent application Ser. No. 09/659,028, filed on Sep. 9, 2000 now abandoned.

BACKGROUND OF THE INVENTION

This invention relates in general to active vehicular braking and suspension systems. In particular, this invention is concerned with detection of rough road conditions using suspension information and then adjusting active braking control for improved performance for the current road surface conditions.

Electronically-controlled active vehicular braking systems can include anti-lock braking (ABS), traction control (TC), and yaw stability control (YSC) functions. In such braking systems, sensors deliver input signals to an electronic control unit (ECU). The ECU sends output signals to electrically activated devices to apply, hold, and dump (relieve) pressure at wheel brakes of a vehicle. Electrically activated valves and pumps are used to control fluid pressure at the wheel brakes. Such valves and pumps can be mounted in a hydraulic control unit (HCU). The valves typically include two-state (on/off or off/on) solenoid valves and proportional valves.

A basic function of active braking systems is to detect wheel slip (e.g., skidding or loss of traction) and actuate the brakes (or reduce torque for the engine) in a manner to reduce or control wheel slip. An individual wheel speed is measured and wheel slip is detected by comparing the individual wheel speed to a target speed determined for that wheel. Various control parameters of the active braking systems are chosen to provide satisfactory performance over all conditions that are encountered during operation. For example, activation of the active control (e.g., ABS or TC) to control slip does not occur until the difference between actual wheel speed and target speed exceeds a slip threshold. A base threshold is chosen that achieves best overall performance for all conditions.

Certain assumptions or tradeoffs are made in selecting a base threshold. For example, the flatness or roughness of the road surface influences the amount of slip that will achieve the highest overall vehicle acceleration or deceleration. Thus, to achieve a shortest stopping distance, there is an optimum slip threshold. Since characterization of road surface condition is not available to prior art systems, the base threshold is chosen for achieving best overall stopping distances.

It is known to dynamically vary this slip threshold in response to certain characteristics of the wheel speed signals (e.g., acceleration changes) to either increase or decrease the amount of slip that is controlled. For example, wheel speed signals have been analyzed in attempts to detect wheel hop, but this has not led to accurate road surface classification.

Electronically-controlled suspension systems typically include semi-active suspension systems and active suspension systems to provide active damping for a vehicle. In such suspension systems, sensors deliver input signals to an electronic control unit (ECU). The ECU sends output signals to electrically activated devices to control the damping rate of the vehicle. Such devices include actuators to control fluid flow and pressure. The actuators typically include electrically activated valves such as two-state digital valves and proportional valves.

SUMMARY OF THE INVENTION

This invention employs information from a suspension sensor to classify a road surface condition (i.e., a rough road index) and modifies activation of an active braking control system in response thereto, achieving advantages in the performance of slip control.

In one aspect of the invention, an apparatus for a vehicle comprises a suspension system for connecting a vehicle body and vehicle wheels. The suspension system includes at least one suspension sensor for sensing an operating parameter of the suspension system and at least one suspension actuator for modifying a performance characteristic of the suspension system. An active suspension control controls the performance characteristic in response to the suspension sensor. A road surface classifier is responsive to the suspension sensor for generating a road surface signal representing a roughness of a road surface over which the vehicle travels. A braking system includes a wheel speed sensor and a brake actuator. An active braking control is coupled to the braking system and the road surface classifier for detecting wheel slip in response to the wheel speed sensor during at least one of braking or accelerating of the vehicle. The active braking control modulates actuation of the brake actuator in response to the detected wheel slip and is responsive to the road surface signal for modifying modulation of the brake actuator as a function of the road surface signal.

Various objects and advantages of this invention will become apparent to those skilled in the art from the following detailed description of the preferred embodiment, when read in light of the accompanying drawings.

DETAILED DESCRIPTION OF PREFERRED EMBODIMENTS

Figure 1:
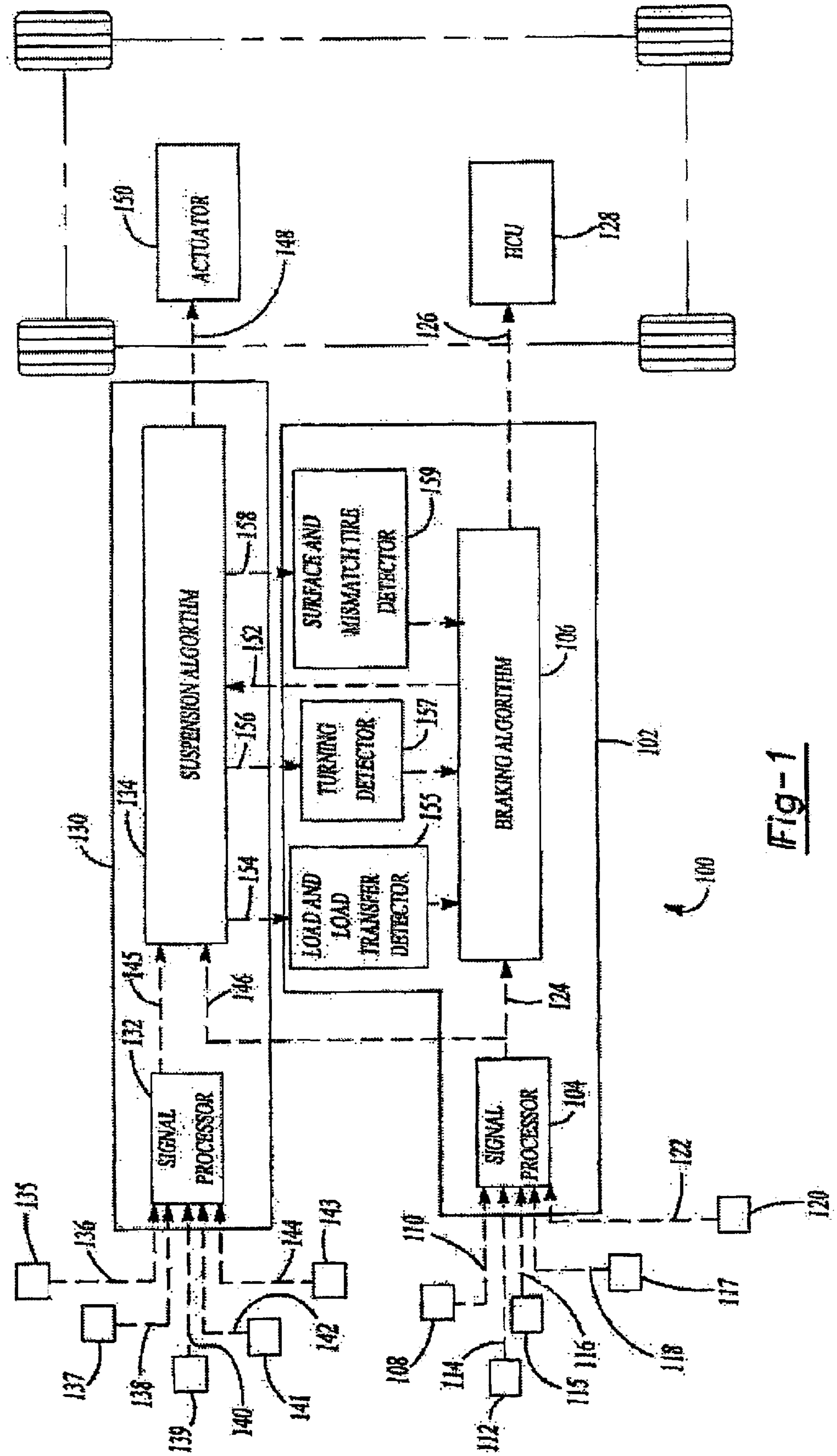
FIG. 1 is a schematic diagram of a first embodiment of an integrated vehicular control system according to the present invention illustrating input signals delivered to electronic control units, transfer of signals between the electronic control units, and output signals delivered from the electronic control units to electrically activated braking and suspension devices.

A first embodiment of a vehicular control system according to the present invention is indicated generally at 100 in FIG. 1. The control system 100 is particularly adapted to control fluid pressure in an electronically-controlled vehicular braking system and an electronically-controlled vehicular suspension system. The braking system can include anti-lock braking, traction control, and yaw stability control functions. The suspension system can include active damping functions.

The control system 100 includes a first electronic control unit (ECU) 102. The first ECU 102 includes a signal processor 104 and a braking algorithm 106. Various sensors 108 strategically placed in a vehicle deliver input signals 110 to the signal processor 104. Specifically, a lateral acceleration sensor 112 delivers an input signal 114 to the signal processor 104. A longitudinal acceleration sensor 115 delivers an input signal 116 to the signal processor 104. A steering wheel sensor 117 delivers an input signal 118 to the signal processor 104. A yaw rate sensor 120 delivers an input signal 122 to the signal processor 104. Depending upon the braking functions of the braking system, some of the above-listed sensors and their associated input signals may be deleted and others may be added. For example, a braking system that provides only ABS and TC functions may not require some of the above-listed sensors.

The signal processor 104 delivers transfer signals 124 to the braking algorithm 106. The braking algorithm 106 delivers output signals 126 to a hydraulic control unit (HCU) 128. The HCU 128 can include electromechanical components such as digital and/or proportional valves and pumps (not illustrated). The HCU 128 is hydraulically connected to wheel brakes and a source of brake fluid, neither of which is illustrated.

The control system 100 also includes a second ECU 130. The second ECU 130 includes a signal processor 132 and a suspension algorithm 134. Various sensors 135 strategically placed in a vehicle deliver input signals 136 to the signal processor 132. Specifically, a suspension state sensor 137 delivers an input signal 138 to the signal processor 132. A suspension displacement sensor 139 delivers an input signal 140 to the signal processor 132. A relative velocity sensor 141 delivers an input signal 142 to the signal processor 132. An upsprung mass acceleration sensor 143 delivers an input signal 144 to the signal processor 132. Depending upon the performance requirements of suspension system, some of the above-listed sensors may be deleted and others may be included.

The second signal processor 132 delivers transfer signals 145 to the suspension algorithm 134. The first signal processor 104 also delivers transfer signals 146 to the suspension algorithm 134. The suspension algorithm 134 delivers output signals 148 to suspension actuators 150, only one of which is illustrated. The actuators 150 are electrically controlled devices such as dampers that vary and control a damping rate of a vehicle. An actuator 150 can include electromechanical components such as digital and proportional valves.

Information from the vehicular braking system can be shared with the vehicular suspension system. For example, ECU 102 can direct information to ECU 130. One example of transferred information from the braking system to the suspension system is the transfer signal 146 from signal processor 104 to suspension algorithm 134. A second example of transferred information from the braking system to the suspension system is indicated by transfer signal 152, wherein information from the braking algorithm 106 is directed to the suspension algorithm 134.

Information from the suspension system can also be shared with the braking system. For example, ECU 130 can direct information to ECU 102. One example of transferred information from the suspension system to the braking system is a transfer signal 154 to a load and load transfer detector 155. Another example is a transfer signal 156 to a turning detector 157. Yet another example is a transfer signal 158 for surface and mismatch tire detector 159.

The control system 100 can be configured in various manners to share information from ECU 102 to ECU 130, and vice versa. In one example, an ECU 102 for the braking system that receives inputs signals 114, 116, 118 and 122, for lateral acceleration, longitudinal acceleration, steering wheel angle, and yaw rate, respectively, can transfer these input signals to ECU 130 for the suspension system. The signal processor 104 of ECU 102 can send transfer signal 146 to the suspension algorithm 134.

In another example, if lateral acceleration and steering wheel angle signals 114 and 122 are not available to the braking system, a turning detector signal can be generated by ECU 130 and transmitted to ECU 102 to improve braking performance. If an electronically controlled suspension system is integrated with an electronically controlled ABS/TC braking system, turning of the vehicle can be detected by the suspension system, thereby generating a turning detector signal that is transmitted to a braking system that does not receive signals from lateral acceleration and steering wheel angle sensors. A turn detection signal to the braking system via ECU 102 can enhance braking performance, particularly during braking-in-turn and accelerating-in-turn.

Figure 2:
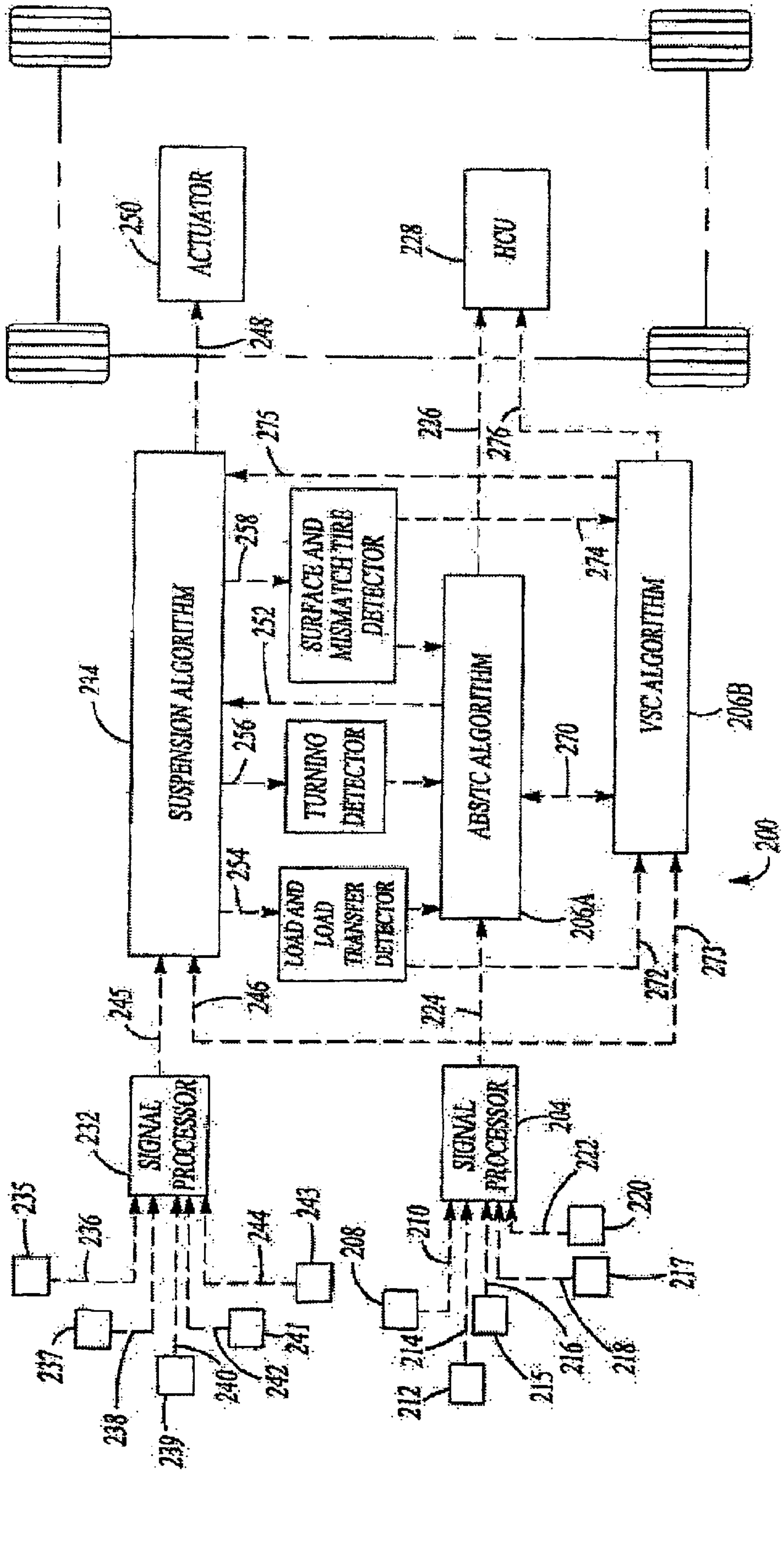
FIG. 2 is a schematic diagram of a second embodiment of an integrated vehicular control system according to the present invention for controlling braking and suspension devices wherein an anti-lock braking/traction control algorithm and a vehicular stability control algorithm are provided.

A second embodiment of a control system for controlling vehicular braking and suspension functions is indicated generally at 200 in FIG. 2. Elements of control system 200 that are similar to elements of control system 100 are labeled with like reference numerals in the 200 series.

Control system 200 also includes an ABS/TC algorithm 206A and a YSC algorithm 206B in place of the braking algorithm 106 of control system 100. Signal processors 204 and 232 may be placed separately from their respective algorithms 206A, 206B, and 230, or they may be located in common ECU's (not illustrated in FIG. 2). Transfer signal 270 between ABS/TC algorithm 206A and VSC algorithm 206B is provided. Transfer signal 272 for load and load transfer is provided to the VSC algorithm 206B. Transfer signal 273 from the signal processor 204 is provided to the VSC algorithm 206B. Transfer signal 274 for the surface and mismatch tire detector is provided to the YSC algorithm 206B. Transfer signal 275 is provided from the YSC algorithm 206B to the suspension algorithm 234. Output signal 276 is sent from the YSC algorithm 206B to the HCU 228.

Various calculations can be made for the suspension system. For example, relative velocity can be calculated from suspension displacement if it is not directly measured. A vehicle load and load transfer signal 154, 254 can also be calculated or enhanced from a lateral acceleration signal 114, a longitudinal acceleration signal 118, and a steering wheel angle signal 122 when these are available.

A load and load transfer signal 154, 254 is used by the braking algorithms to enhance braking torque proportioning and apply and dump pulse calculations.

A turning detector signal 156, 256 (roll moment distribution) can be used to optimize vehicle handling before YSC activation and enhance brake torque distribution calculation during YSC activation.

A road surface roughness and tire mismatching signal 158, 258 can be detected from suspension states and used by ABS/TC and YSC systems.

Braking/traction status information from the wheels can also be used to enhance braking algorithms by predicting pitch and roll motion in advance.

Suspension algorithms and braking algorithms can be embodied in separate ECU's 102 and 130 as illustrated in FIG. 1. In other embodiments, the suspension and braking algorithms can be integrated into a single electronic control unit.

If steering wheel angle signal 122, 222 and/or a lateral acceleration signal 114, 214 are available, then split mu detection in ABS and TC algorithms (for stand alone ABS and TC systems) can be improved.

In other examples, ECU 102 can only receive information from ECU 130. Thus, various input signals from the suspension system can be transferred to the braking system, but no signals are transferred from the braking system to the suspension system.

In yet other examples, ECU 130 can only receive information from ECU 102. Thus, various input signals from the braking system can be transferred to the suspension system, but no signals are transferred from the suspension system to the braking system.

Figure 3:
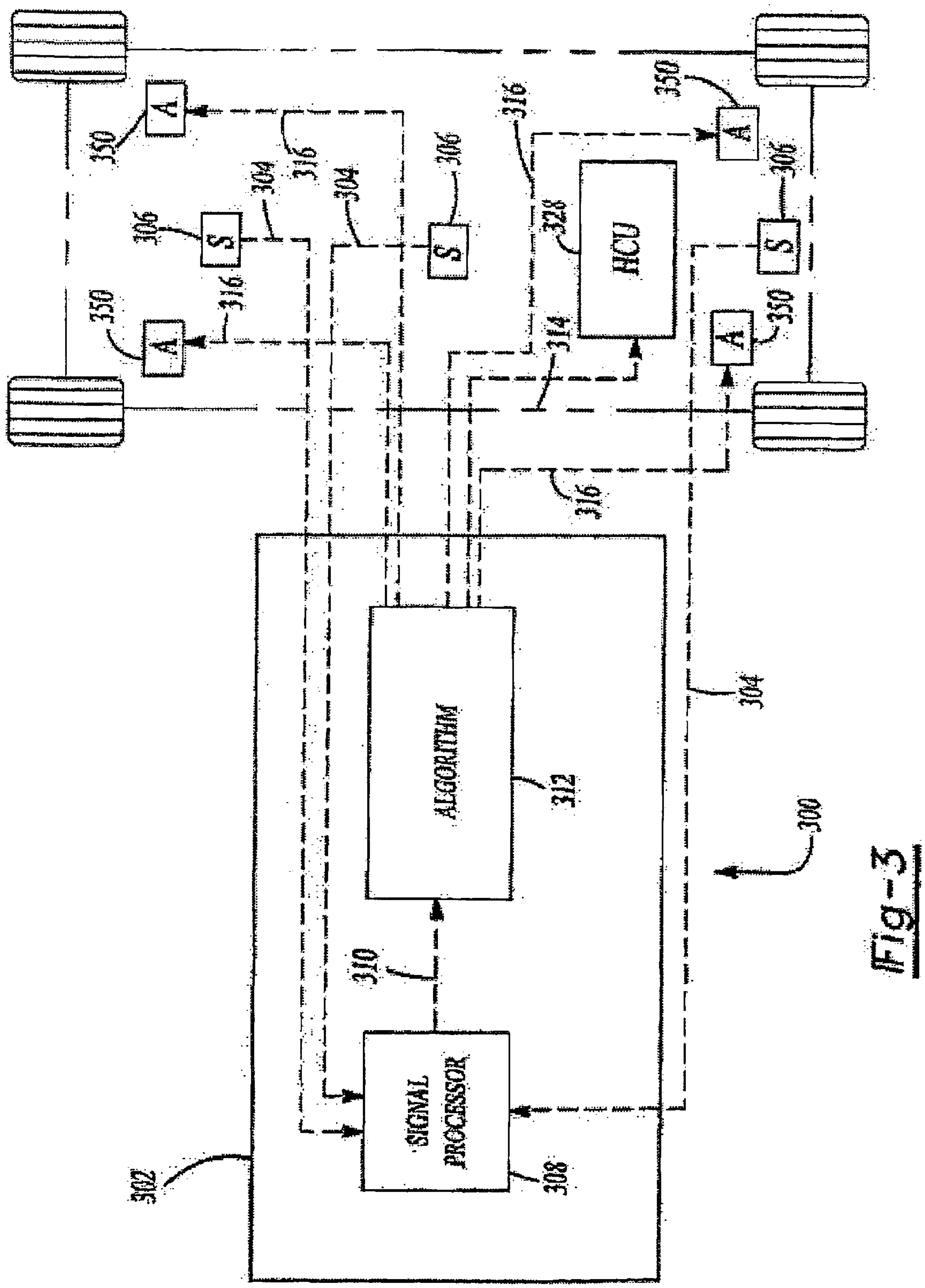
FIG. 3 is a schematic diagram of a third embodiment of an integrated vehicular control system according to the present invention for controlling braking and suspension devices wherein a single electronic control unit is utilized.

A third embodiment of a control system for controlling vehicular braking and suspension functions is indicated generally at 300 in FIG. 3. In control system 300, a single ECU 302 receives inputs signals 304 from various sensors 306 strategically placed in a vehicle. A signal processor 308 may be incorporated in the ECU 302 that delivers transfer signals 310 to an algorithm 312. The algorithm 312 delivers output signals 314 to a HCU 328 to provide a desired brake response. The algorithm 312 also delivers output signals 316 to actuators 350 to provide a desired suspension response. Control system 300 may be referred to as a totally integrated system for controlling vehicular braking and suspension.

The present invention employs a rough road index as a classification of the road surface for the purpose of enhancing ABS, TC and YSC functions. The generation of the rough road index will be described with reference to FIG. 4. The intent of the rough road identification algorithm is to create a signal indicative of a rough surface terrain from suspension travel information. The signal is then used in ABS/TCS/YSC to modify activation thresholds and control targets.

Figure 4:
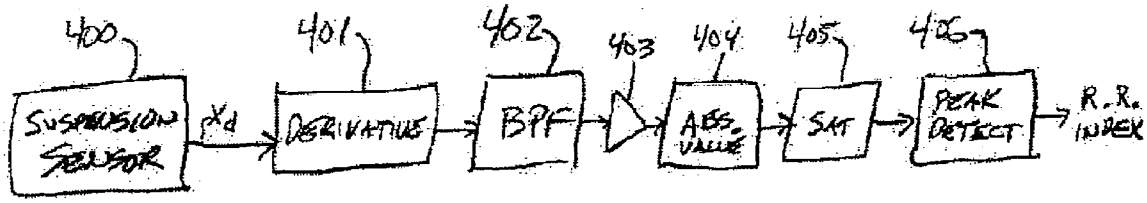
FIG. 4 illustrates the generation of a rough road index according to the present invention.

The method of FIG. 4 uses a relative suspension travel signal $X_d$ from a suspension sensor 400. The relative travel is differentiated in derivative block 401 to give a relative velocity signal which is then filtered in a bandpass filter (BPF) 402. The direct detection of wheel hop is employed to classify the road surface in terms of roughness. In general, wheel hop frequency caused by rough road conditions is approximately 10 Hz. Thus, BPF 402 has a passband of about 10 Hz to 15 Hz to determine the amount of surface roughness being transmitted through the suspension. A $4^{th}$ order Butterworth bandpass filter design can be used as follows:

$$G(s) = \frac{b_2 s^2}{s^4 + a_1 s^3 + a_2 s^2 + a_3 s + a_4}$$

$b_2=1421$ $a_1=53.31$ $a_2=6415$ $a_3=1.331\times10^5$ $a_4=6.235\times10^6$

The output of the bandpass filter represents the signal content of interest that is used to define the roughness of the road. If an active damping system is being used to control the relative wheel and body velocity, then the signal content in the wheel hop frequency range will be attenuated as measured through the relative suspension deflection, however, the road information is not removed by the damping change. Therefore, a gain 403 is inserted to change the signal content as a function of damping. The nominal value for the gain is one.

In block 404, the absolute value of the signal is taken to give a more energy-oriented parameter. The signal is then saturated in saturation block 405 to keep the peak detection from artificially being pulled too high and then taking several seconds to decay. A peak detector 406 implements a peak detection algorithm to capture the peak of $|\dot{X}_d|$ and to decay the index between peaks. Peak detector 406 generates the rough road index as an indication of the magnitude of the roughness of the road surface. The decay rate must be designed in accordance with the bandpass frequency. It is desired to exponentially decay (i.e., $e^{-t/\tau}$) between peaks. $\lambda^k$ is the discrete implementation of $e^{-t/\tau}$, therefore, one must choose X such that the desired decay rate ($\tau$) is achieved. The following is a formulation for computing the appropriate $\lambda$:

Let$f_{avg}$=average frequency of the bandpass filter $\tau=1/f_{avg}$ $\lambda^k=e^{-t/\tau}$, at $t=\tau\rightarrow k=\tau/T_s$ $\lambda^k=e^{-1}$ $k\ln(\lambda)=-1$ $\lambda=e^{-1/k}=e^{-Ts/\tau}$ Choose actual $\tau=100/f_{avg}$ The actual peak detection is realized by the following:

If $|\dot{X}_d|>\lambda\cdot$Peak Then
  Peak=$|\dot{X}_d|$
Else
  Peak=$\lambda\cdot$Peak$(z^{-1})$
Endif The output of the peak detect circuit can be appropriately scaled for use in the ABS, TCS, or YSC algorithms. The rough road index signal can be a continuous signal or can be quantized to provide a discrete level indication. Thus, there would be a maximum peak velocity from the peak detect circuit which would be assigned to a maximum magnitude of the rough road index signal and a lower or minimum peak velocity which would be assigned to a zero value of the rough road index (i.e., a smooth road). The lower peak velocity is preferably greater than zero in order to reject noise. Thus, one preferred formula for the rough road index is:

$$RRID=C\cdot(\text{Peak}-\text{Peak\_Min})\div(\text{Peak\_Max}-\text{Peak\_Min}),$$

where RRID is the rough road index, C is a scaling factor for the maximum value of the RRID, Peak_Min is the minimum peak velocity below which RRID is zero, and Peak_Max is the maximum peak velocity corresponding to the roughest road.

The trimming of the algorithm takes into account the physical properties of the suspension. For example, suspension properties such as spring stiffness, nominal damping rate, and sprung and unsprung masses help determine the specific implementations of the derivative and bandpass filters.

Using the rough road index from FIG. 4, the performance of ABS, TCS, and YSC functions are enhanced during maneuvers where wheel hop due to surface irregularities generally degrades performance. The enhancement in the manner in which the slip control systems modify their modulation of brake actuation preferably comprises permitting an increased amount of wheel slip. Controlling to a greater amount of wheel slip generally improves performance in the case of a deformable surface such as snow or loose gravel where less tire rotation can promote digging into or plowing into the deformable surface to shorten stopping distance, for example.

Preferred methods of increasing the amount of wheel slip will be described with reference to FIG. 5. This description is in the context of an ABS system where wheels are decelerating, although the concepts also apply in an analogous manner to a traction control system where wheels are accelerating.

During braking, a vehicle generally decelerates. Curve 410 shows the slowing deceleration of the vehicle. A curve 411 is an actual wheel speed as measured at a wheel as the vehicle is braking. As the wheel begins to slip or skid, the wheel speed drops faster that the vehicle speed. In order to maximize brake performance, the wheel speed should be controlled to a target wheel speed 412 which corresponds to an amount of wheel slip where maximum braking force is obtained. Assuming the wheel is slipping, then the actual wheel speed cannot be used to establish the target speed. Instead, a target speed is maintained by decaying a previous value of the wheel speed according to a predetermined gradient. The gradient can be determined in response to overall vehicle deceleration and/or deceleration of the wheel prior to the onset of slipping, for example.

The difference between target speed 412 and actual speed 411 is monitored. When the difference equals a predetermined threshold, then an ABS activation decision is made and the ABS system begins to modulate the braking to control the slip. A nominal threshold $\Delta_1$ corresponds to a base threshold as used in the prior art. The difference exceeds threshold $\Delta_1$ at a time $t_1$ resulting in an ABS activation event. In order to increase the amount of slip permitted when a rough road is indicated, one preferred embodiment of the present invention uses an increased slip threshold $\Delta_2$. This delays an activation decision until $t_2$ when the difference between target speed 412 and actual speed 411 exceeds $\Delta_2$.

Figure 6:
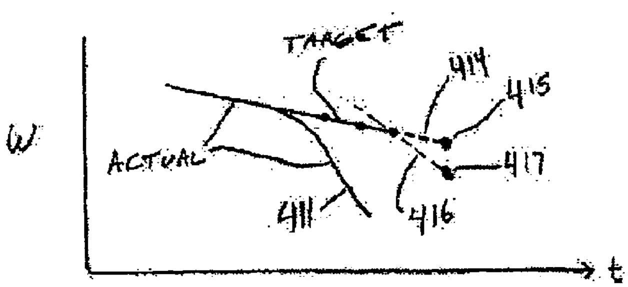
FIG. 6 shows actual wheel speed after the onset of slip during the ABS braking cycle shown in FIG. 5.

FIG. 6 shows actual wheel speed 411 after the onset of slip. A target wheel speed is determined based on a predetermined gradient or decay 414 (which would instead be an increase during acceleration in a traction control system). Based on following the predetermined gradient from the previous target wheel speed value, a current target wheel speed value 415 is generated. In a second preferred embodiment of the present invention, the increased slip desired when the rough road index is high is obtained using an increased gradient 416. Following increased gradient 416 generates a current target wheel speed value 417 which is less than target speed 415.

Figure 7:
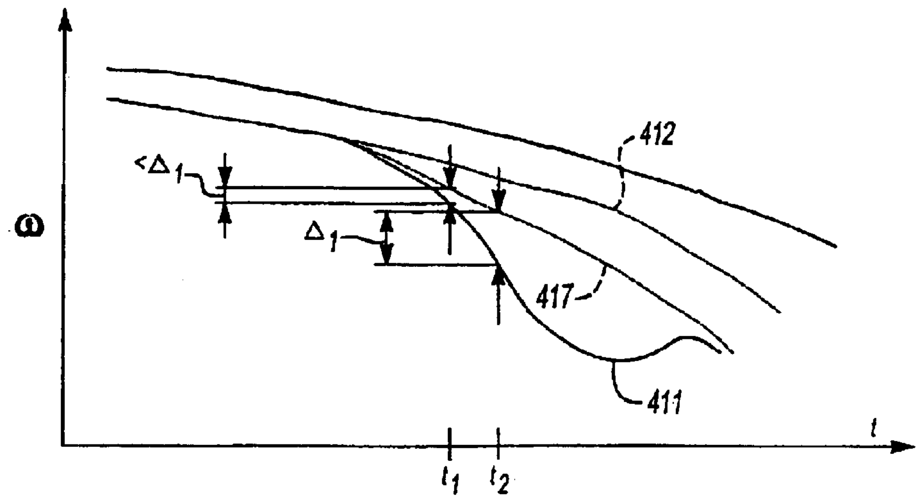
FIG. 7 illustrates another typical ABS braking cycle that illustrates methods of increasing wheel slip according to the present invention and that includes a greater gradient than shown in FIG. 5.

Referring to FIG. 7, using an increased gradient results in a target wheel speed curve 417 which decays more quickly than prior art target curve 412. Consequently, at time $t_2$ the difference between the target wheel speed and the actual wheel speed is less than the nominal threshold $\Delta_1$. Due to the faster decay of the target wheel speed, the difference does not exceed nominal threshold $\Delta_1$ until time $t_2$. Slip is thereafter controlled to a lower target wheel speed curve 417 so that an increased slip level is maintained.

The rough road index signal can be generated in either the active braking control or the active suspension control system. When generated in the active suspension system, the value of the rough road index signal can be transmitted to the active braking control system via a multiplex communication network, such as CAN, for example.

Figure 5:
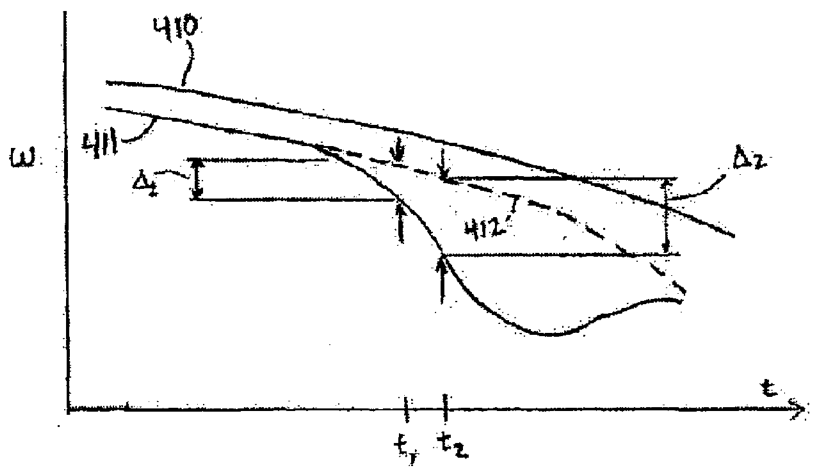
FIG. 5 shows a typical ABS braking cycle that illustrates methods of increasing wheel slip according to the present invention to improve braking performance upon a deformable surface.
Figure 8:
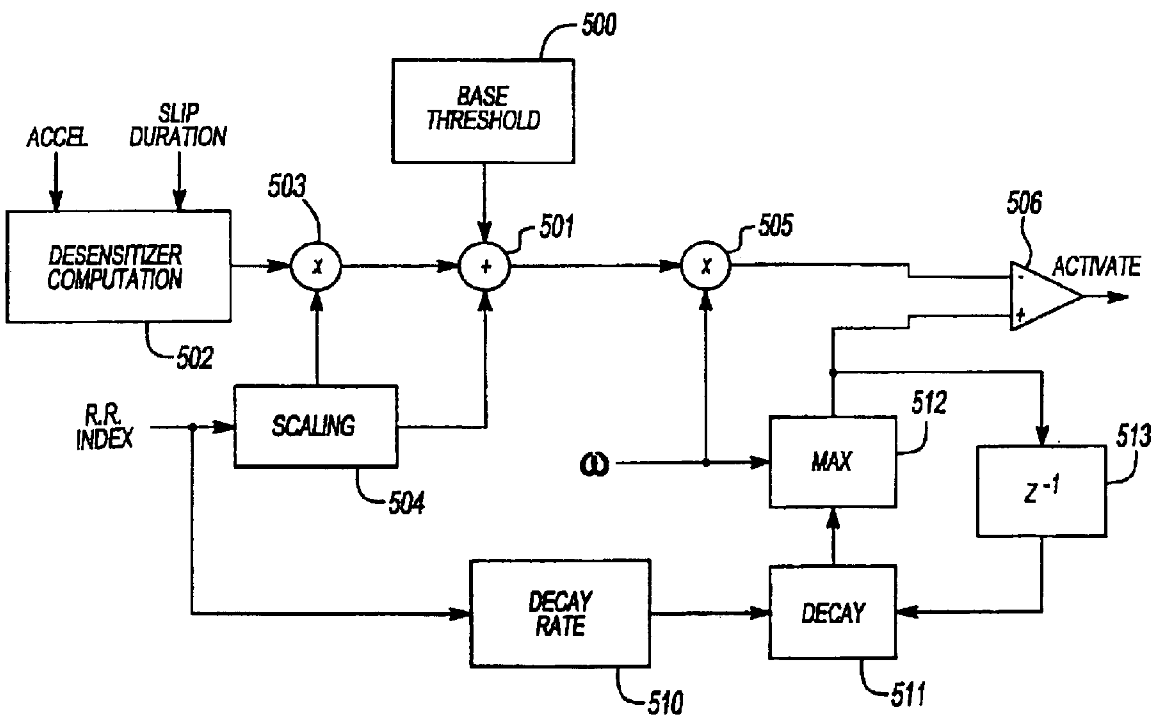
FIG. 8 illustrates an apparatus according to the invention that includes improvements according to the present invention for making the ABS activation decision shown in FIGS. 5 and 7.

FIG. 8 shows apparatus with several separate improvements for making the modified activation decision according to FIGS. 5 and 7. A base threshold 500 is typically determined as a fixed percentage of current vehicle speed (e.g., 10%). The base threshold is coupled to one input of a summer 501. The prior art has included various additions to and subtractions from the base threshold. For example, U.S. Pat. No. 5,627,755 shows a desensitizer computation 502 based on acceleration and slip duration which increases the final threshold. U.S. Pat. No. 5,627,755 is hereby incorporated by reference. This desensitizer addition may be added to the base threshold in summer 501. The final threshold is multiplied by actual wheel speed in a multiplier 505 and the product is compared to a target wheel speed in a comparator 506 which generates an activation signal.

FIG. 8 shows modifications in both the determination of the final threshold value and the determination of decay rate for determining target wheel speed, although both modifications would not usually be used together.

To adjust the activation threshold, the rough road index is coupled to a scaling block 504 to provide a desired transfer function as appropriate for the relative values used in the control system. Scaling takes into account any differences in relative magnitude for maximum roughness, and matches the general phasing of the signal (i.e., the circuit providing the rough road index signal may have more lead depending on the equations used). The scaling block may also provide filtering to smooth out fast changes in the rough road index so that signal dynamics do not cause significant digital noise downstream. This filtering works as follows:

```
If road_id_in >= ABS_road_id_filt
    ABS_road_id_filt = road_id_in
    road_id_timer = 0
Else
    road_id_timer = road_id_timer + 1
Endif
If road_id_timer >= 200 msec
    road_id_timer = 0
    If ABS_road_id_filt > 0
        ABS_road_id_filt = ABS_road_id_filt - 1
    Endif
Endif
```

Where road_id_in is the rough road signal from FIG. 4 and ABS_road_id_filt is the filtered rough road signal. This filter allows positive changes in the road ID to pass through and then requires 200 milliseconds to pass before allowing the signal to reduce.

In a preferred embodiment, the scaled/filtered rough road index is provided to one input of a multiplier 503, the other input of which receives the desensitizer factor from desensitizer computation 502. The rough road index is scaled such that increasing surface roughness increases the amount of desensitization by preselected proportions. This preferred embodiment is particularly advantageous in the interplay with the prior art desensitization computation. Increased slip is primarily beneficial when a deformable road condition is present. It has been found that instances when both the prior art desensitization and the present rough road index are relatively large is a good indicator of deformable road conditions. Thus, using the product of the two results in enhanced performance.

In an alternative embodiment, the rough road index is scaled for additive affect upon the final threshold value. Thus, the scaled rough road index is provided to an input of summer 501. This input to the summer is an alternative to the use of multiplier 503.

In another alternative embodiment, the decay rate used in determining target wheel speed is adjusted in response to the rough road index. Thus, the rough road index signal is provided to a decay rate generator 510. The selected decay rate is provided to a decay block 511 that receives the previous target wheel speed from a unit delay block 513. The decayed target wheel speed is provided from decay block 511 to one input of a maximum selector block 512 which also receives the current actual wheel speed measurement. Maximum selector block provides the greater of the current wheel speed or the decayed previous target speed to the non-inverting input of comparator 506 and to the input of unit delay block 513. the general phasing of the signal (i.e. one design may have more lead than another depending on the equations used).

A more specific example of the "reference decay increase" modification will now be described. The rough road ID signal is quantized to values of 0, 1, 2, or 3 for each wheel and depending on the overall vehicle average. The reference gradient for updating target wheel speed is decayed for ABS and increased for TCS.

Definition of variables is as follows:

| Name | Description | Units | Resolution |
|---|---|---|---|
| ABS_road_id_filt | Filtered road ID input for use in ABS and TCS functions | — | 1 |
| Ax | Estimated vehicle acceleration input | m/sec$^2$ | 1/256 |
| Temp | Temporary value that is added to the previous reference value in order to decay or increase the control reference | km/h/loop | 1/256 |

The following pseudo code illustrates a preferred implementation.

```
If sum(ABS_road_id_filt(1:4))/4 = 0
    Temp = max(-ax,REF_DECAY_RATE_MIN)·REF_OVER_DK/
        ABS_LOOPS_PER_SEC/16384
Endif
If sum(ABS_road_id_filt(1:4))/4 = 1
    Temp = max(-ax,REF_DECAY_RATE_MIN)·REF_OVER_DK01/
        ABS_LOOPS_PER_SEC/16384
Endif
If sum(ABS_road_id_filt(1:4))/4 = 2
    Temp = max(-ax,REF_DECAY_RATE_MIN)·REF_OVER_DK02/
        ABS_LOOPS_PER_SEC/16384
Endif
If sum(ABS_road_id_filt(1:4))/4 = 3
    Temp = max(-ax,REF_DECAY_RATE_MIN)·REF_OVER_DK03/
        ABS_LOOPS_PER_SEC/16384
Endif
```

REF_DECAY_RATE_MIN is the minimum of the reference gradient. Temp modifies the reference gradient used in the ABS algorithm. One of four different gain values (i.e., REF_OVER_DK) are selected in response to the average level of the road identification signals in order to modify Temp. A similar algorithm is used for traction control gradient modifications, however, the incremental change is increasing instead of decreasing.

A more specific example of the "slip threshold increase" modification of the present invention will now be described. The rough road ID signal is used to increase the slip threshold by multiple integers of 5% of vehicle speed. An additional variable for this pseudo-code implementation is ABS_sthr_final_abslt which is the ABS slip threshold for each wheel in km/h with a resolution of 1/256:

```
Surface_id_rear =min(max(front_road_id[1:2]), rear_road_id
    [1:2])
```

```
/* Select lowest value between maximum of front and smallest of rears as the
modifier */
ABS_sthr_final_abslt *= (1 + ABS_road_id_filt(
Surface_id_rears)*0.12 (0.08 for rears))
/* Increasing the final slip threshold by multiple integers of 12% (8% for rears) */
T = 5*ABS_road_id_filt*filtered wheel speed/100
/* Adding integer values of 5% of vehicle speed to slip threshold */
```

-continued

```
If T < 3 km/h
    T = 3 km/h
Endif
/* Minimize to 3 km/h unless road_id = 0 */
If ABS_road_id_filt (Surface_id_rear[1:2]) = 0
    T = 0
Endif
ABS_sthr_final_abslt += T
```

The ABS slip threshold is then used for activation detection and cyclical wheel control modes. The increase in the threshold for activation inherently will increase the level of slip to which the wheel is being controlled.

An analogous implementation is performed for the slip thresholds for TC, thus increasing the amount of spin on the driven wheels.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Apparatus for a vehicle, comprising:

an active suspension system for connecting a vehicle body and vehicle wheels, said suspension system including at least one suspension sensor for sensing an operating parameter of said suspension system and at least one suspension actuator for modifying a performance characteristic of said suspension system;

an active suspension control for controlling said suspension system performance characteristic in response to said suspension sensor;

a road surface classifier responsive to said suspension sensor for generating a road surface signal representing a roughness of a road surface over which said vehicle travels;

a braking system including a wheel speed sensor and a brake actuator; and an active braking control for detecting wheel slip in response to said wheel speed sensor during at least one of braking or accelerating of said vehicle and for modulating actuation of said brake actuator in response to said detected wheel slip, said active braking control being responsive to said road surface signal for modifying modulation of said brake actuator as a function of said road surface signal.

2. The apparatus of claim 1 wherein said modification of brake actuator modulation is comprised of permitting an increased amount of wheel slip.

3. The apparatus of claim 2 wherein said active braking control determines an actual wheel speed in response to signals from said wheel speed sensor, wherein said active braking control determines a target wheel speed in response to a predetermined wheel speed gradient from previously determined actual wheel speed, wherein said active braking control compares said actual wheel speed and said target wheel speed to determine said modulation, and wherein said increased amount of wheel slip is obtained by increasing said predetermined wheel speed gradient as a function of said road surface signal.

4. The apparatus of claim 2 wherein said active braking control determines an actual wheel speed in response to signals from said wheel speed sensor, wherein said active braking control determines a target wheel speed in response to a predetermined gradient from previously determined actual wheel speed, wherein said active braking control compares a difference between said actual wheel speed and said target wheel speed with a threshold in order to determine said modulation, and wherein said increased amount of wheel slip is obtained by increasing said threshold as a function of said road surface signal.

5. A method of making an activation decision in a wheel slip control system installed in a vehicle, said vehicle including a suspension system, said method comprising the steps of:

determining an actual wheel speed for a wheel of said vehicle;

generating a rough road index in response to a measured operating parameter of said suspension system;

determining a wheel speed gradient as a function of said rough road index;

determining a target wheel speed for said wheel from a previously determined target wheel speed modified by said wheel speed gradient;

determining a difference between said target wheel speed and said actual wheel speed; and comparing said difference with a threshold and activating said wheel slip control system if said difference exceeds said threshold.

6. The method of claim 5 wherein said activation decision is an anti-lock braking decision and wherein said predetermined gradient is a speed decay.

7. The method of claim 5 wherein said activation decision is a traction control decision and wherein said predetermined gradient is a speed increase.

8. A method of making an activation decision in a wheel slip control system installed in a vehicle, said vehicle including a suspension system, said method comprising the steps of:

determining an actual wheel speed for a wheel of said vehicle;

generating a rough road index in response to a measured operating parameter of said suspension system;

determining a threshold as a function of said rough road index;

determining a target wheel speed for said wheel from a previously determined target wheel speed;

determining a difference between said target wheel speed and said actual wheel speed; and comparing said difference with said threshold and activating said wheel slip control system if said difference exceeds said threshold.

9. The apparatus of claim 2 wherein said suspension sensor is a suspension travel sensor.

10. The apparatus of claim 2 wherein said road surface signal is a function of the derivative of the suspension travel measured by said suspension travel sensor.

11. The apparatus of claim 5 wherein the operating parameter of the suspension system used to generate the rough road index is suspension travel.

12. The apparatus of claim 11 wherein the road surface signal is a function of the derivative of the suspension travel.

* * * * *